US011655774B2

United States Patent
Le et al.

(10) Patent No.: US 11,655,774 B2
(45) Date of Patent: May 23, 2023

(54) INJECTOR FAILURE DIAGNOSTIC DEVICE AND INJECTOR FAILURE DIAGNOSTIC METHOD

(71) Applicant: HITACHI CONSTRUCTION MACHINERY CO., LTD., Tokyo (JP)

(72) Inventors: Tien Trien Le, Kanagawa (JP); Hisashi Yokoyama, Ibaraki (JP); Takahiro Sagara, Kanagawa (JP); Satoshi Inose, Ibaraki (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 0 days.

(21) Appl. No.: 17/435,717

(22) PCT Filed: Mar. 27, 2020

(86) PCT No.: PCT/JP2020/014096
§ 371 (c)(1),
(2) Date: Sep. 2, 2021

(87) PCT Pub. No.: WO2020/203795
PCT Pub. Date: Oct. 8, 2020

(65) Prior Publication Data
US 2022/0154661 A1    May 19, 2022

(30) Foreign Application Priority Data
Mar. 29, 2019 (JP) .............................. JP2019-066663

(51) Int. Cl.
*F02D 41/22* (2006.01)
*F02D 41/00* (2006.01)

(52) U.S. Cl.
CPC ....... *F02D 41/221* (2013.01); *F02D 41/0087* (2013.01); *F02D 2041/224* (2013.01); *F02D 2200/025* (2013.01)

(58) Field of Classification Search
CPC ............... F02D 41/0087; F02D 41/221; F02D 2041/224; F02D 2200/025
(Continued)

(56) References Cited

U.S. PATENT DOCUMENTS

| 5,864,055 A * | 1/1999 | Borrione | F02D 41/221 73/35.03 |
| 7,103,460 B1 * | 9/2006 | Breed | G07C 5/008 706/15 |

(Continued)

FOREIGN PATENT DOCUMENTS

| CN | 101463769 A | 6/2009 |
| DE | 102012021985 A1 | 5/2014 |

(Continued)

OTHER PUBLICATIONS

International Search Report of PCT/JP2020/014096 dated Jun. 16, 2020.

(Continued)

*Primary Examiner* — Erick R Solis
(74) *Attorney, Agent, or Firm* — Mattingly & Malur, PC (57) ABSTRACT

An injector failure diagnostic device 1 diagnoses injector failures for a multi-cylinder internal combustion engine 2 having injectors 21 to 24, each injector injects fuel to the corresponding cylinder. The injector failure diagnostic device 1 includes: an operating sound obtainment unit 12 configured to obtain current operating sound that is operating sound when all of the injectors operate, and obtain pseudo-failure operating sound sequentially for each of the injectors, the pseudo-failure sound being operating sound generated by stopping the fuel injection from one injector while maintaining the operation of the remaining injectors; and a faulty injector identification unit 13 configured to determine whether or not the pseudo-failure operating sound of each injector obtained by the operating sound obtainment (Continued)

unit 12 is similar to the current operating sound to identify a faulty injector.

6 Claims, 10 Drawing Sheets

(58) Field of Classification Search
USPC .............................. 123/479, 481; 73/114.45
See application file for complete search history.

(56) References Cited

U.S. PATENT DOCUMENTS

| | | | | |
|---|---|---|---|---|
| 7,971,475 | B2* | 7/2011 | Schneider | F02D 41/22 |
| | | | | 73/114.07 |
| 8,099,231 | B1* | 1/2012 | Suwa | F02D 41/403 |
| | | | | 701/111 |
| 9,824,511 | B2* | 11/2017 | Valeri | G07C 5/0808 |
| 11,236,694 | B2* | 2/2022 | Lee | F02D 41/2474 |
| 2002/0148441 | A1* | 10/2002 | Tuken | F02D 41/0085 |
| | | | | 73/114.25 |
| 2002/0194915 | A1* | 12/2002 | Abdel-Malek | G01N 29/14 |
| | | | | 73/587 |
| 2008/0133177 | A1* | 6/2008 | Klenk | F02D 41/22 |
| | | | | 702/183 |
| 2008/0228341 | A1* | 9/2008 | Orifij | F02D 41/402 |
| | | | | 701/31.4 |
| 2009/0158833 | A1 | 6/2009 | Kusatsugu | |
| 2009/0199628 | A1* | 8/2009 | Hartmann | F02D 41/3076 |
| | | | | 73/114.79 |
| 2015/0281838 | A1* | 10/2015 | Hershey | G06K 9/6292 |
| | | | | 381/71.4 |
| 2018/0017961 | A1 | 1/2018 | Bense et al. | |
| 2018/0372014 | A1* | 12/2018 | Laviola | F02D 41/0087 |
| 2019/0353133 | A1* | 11/2019 | Hakeem | F02P 5/1521 |

FOREIGN PATENT DOCUMENTS

| | | |
|---|---|---|
| JP | 63-150463 A | 6/1988 |
| JP | 2000321176 A | 11/2000 |
| JP | 2002122037 A | 4/2002 |
| JP | 2005120842 A | 5/2005 |
| JP | 2009150246 A | 7/2009 |
| JP | 2014201085 A | 10/2014 |
| JP | 2015140038 A | 8/2015 |
| JP | 2016014375 A | 1/2016 |

OTHER PUBLICATIONS

European Search Report No. 20783391.4 dated Sep. 28, 2022.
Korean Office Action received in corresponding Korean Application No. 10-2021-7024223 dated Oct. 13, 2022.
Chinese Office Action received in corresponding Chinese Application No. 202080013917.9 dated Nov. 25, 2022.

* cited by examiner

FIG. 10

INJECTOR FAILURE DIAGNOSTIC DEVICE AND INJECTOR FAILURE DIAGNOSTIC METHOD

TECHNICAL FIELD

The present invention relates to injector failure diagnostic devices for multi-cylinder internal combustion engine having injectors, each injector injects fuel to the corresponding cylinder, and methods for injector failure diagnosis.

The present application claims priority from Japanese patent application JP 2019-066663 filed on Mar. 29, 2019, the entire content of which is hereby incorporated by reference into this application.

BACKGROUND ART

In some vehicles such as construction machineries equipped with multi-cylinder internal combustion engines, the controller of the internal combustion engine has a failure diagnostic function that enables detection of failures, such as disconnection and short circuit, by monitoring the energization of the injectors that inject fuel into the cylinders. Although this failure diagnostic function detects electrical failures of the injectors, it is difficult for the function to detect a mechanical failure of the injectors due to a fuel leak or stiffness. For this reason, failures are often not noticed until a performance deterioration due to the mechanical failure occurs or an obvious abnormal state such as white smoke or black smoke occurs. This means that a malfunction suddenly happens. Such a sudden malfunction may cause downtime of the construction machinery and hinder the stable operation of the construction machinery.

A method then has been proposed, in which fuel injection is intentionally stopped for each cylinder, and a mechanical failure is diagnosed by the operator based on changes in the operating sound of the internal combustion engine based on the hearing of the operator. This method, however, is based on the sensory perception of human hearing, and it not only depends on the rich experiences and advanced knowledge of the operator, but also causes a problem that the results are likely to vary.

Patent Literature 1 discloses a method of identifying a faulty injector using the undulation in the rotation fluctuation during one cycle of the cylinders of the multi-cylinder internal combustion engine.

Patent Literature 2 discloses a method for identifying a faulty injector based on the indicated fuel injection amount. Specifically, this method stops two of the injectors at the same time to measure a change in the indicated fuel injection amount, and then identifies a faulty injector based on the fact that the faulty injector does not inject fuel.

CITATION LIST

Patent Literature

Patent Literature 1 JP 2002-122037 A
Patent Literature 2 JP 2016-014375 A

SUMMARY OF INVENTION

Technical Problem

The method described in Patent Literature 1 requires the setting of a threshold for the rotational fluctuation to identify a faulty injector based on the undulation of the fluctuation. In order to improve the diagnostic accuracy, it is also necessary to develop a model tailored to the housing and the environment in which the internal combustion engine operates.

The method described in Patent Literature 2 has less effect of the combination of cylinders that stop at the same time when the number of cylinders is large. When the number of cylinders is small such as four cylinders, however, the change in the indicated fuel injection amount may differ depending on the combination of two cylinders that stop at the same time, and this may degrade the diagnostic accuracy.

In view of the above-described circumstances, the present invention aims to provide an injector failure diagnostic device capable of diagnosing mechanical failures of injectors simply and with high accuracy, and also capable of easily identifying a faulty injector, and provide such a method for injector failure diagnosis.

Solution to Problem

An injector failure diagnostic device according one aspect of the present invention is for a multi-cylinder internal combustion engine having a plurality of injectors, each injector injects fuel to a corresponding cylinder. The injector failure diagnostic device includes: an operating sound obtainment unit configured to obtain a current operating sound that is the operating sound when all of the injectors are operated, and obtain a pseudo-failure operating sound sequentially for each of the injectors, the pseudo-failure sound being the operating sound generated by stopping the fuel injection from one injector while maintaining the operation of the remaining injectors; and a faulty injector identification unit configured to determine whether or not the pseudo-failure operating sound of each injector obtained by the operating sound obtainment unit is similar to the current operating sound to identify a faulty injector.

The injector failure diagnostic device according to the present invention is configured so that the operating sound obtainment unit obtains the current operating sound and the pseudo-failure operating sound for each injector, and the faulty injector identification unit determines whether the pseudo-failure operating sound of each injector is similar or not to the current operating sound to identify a faulty injector. The injector failure diagnostic device therefore easily diagnoses the mechanical failure of the injectors and easily identifies the faulty injector. The accuracy of diagnosis improves as compared with the diagnosis with human hearing.

A method for diagnosing an injector failure according to another aspect of the present invention diagnosis failures in a multi-cylinder internal combustion engine having a plurality of injectors, each injector injects fuel to a corresponding cylinder. The method includes: a current operating sound obtainment step of obtaining a current operating sound that is the operating sound when all of the injectors are operated; a pseudo-failure operating sound obtainment step of obtaining a pseudo-failure operating sound sequentially for each of the injectors, the pseudo-failure sound being the operating sound generated by stopping the fuel injection from one injector while maintaining the operation of the remaining injectors; and a diagnosis step of determining whether or not the pseudo-failure operating sound of each injector obtained by the pseudo-failure operating sound obtainment step is similar to the current operating sound obtained at the current operating sound obtainment step to identify a faulty injector.

In the method for diagnosing an injector failure according to the present invention, the current operating sound obtainment step obtains the current operating sound, the pseudo-failure operating sound obtainment step obtains the pseudo-failure operating sound for each injector, and the diagnosis step determines whether the pseudo-failure operating sound of each injector is similar or not to the current operating sound to identify a faulty injector. The method therefore easily diagnoses the mechanical failure of the injectors and easily identifies the faulty injector. The accuracy of diagnosis improves as compared with the diagnosis with human hearing.

Advantageous Effects of Invention

The above aspects of the present invention enable simple and accurate diagnosis of mechanical failures of injectors, and also easy identification of a faulty injector.

DESCRIPTION OF EMBODIMENTS

The following describes some embodiments of an injector failure diagnostic device and a method for injector failure diagnosis according to the present invention, with reference to the drawings. Like reference numerals designate like parts throughout the drawings of the present specification to omit their redundant explanations.

First Embodiment of Injector Failure Diagnostic Device

Figure 1:
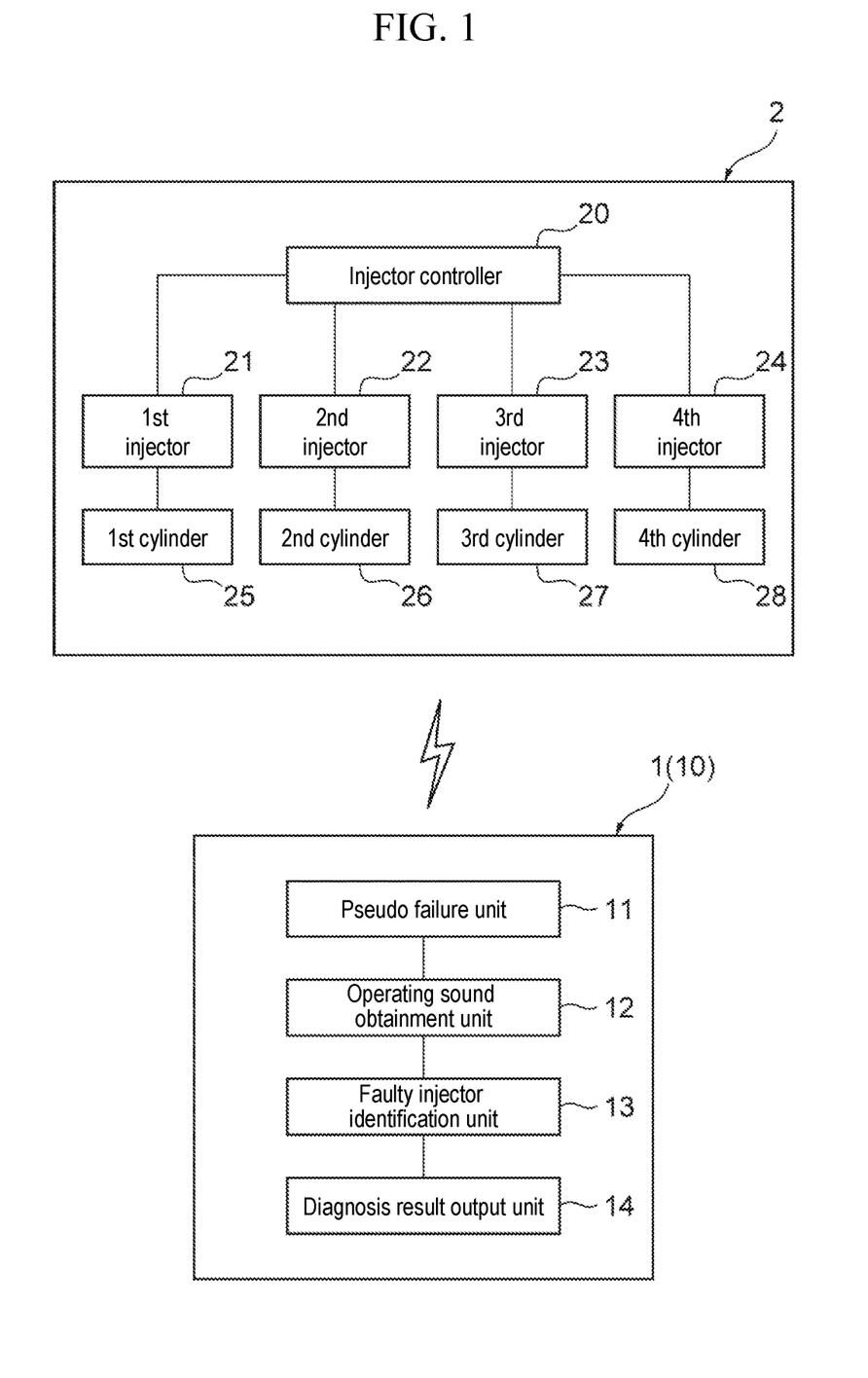
FIG. 1 is a schematic view showing the configuration of an injector failure diagnostic device according to a first embodiment.

FIG. 1 is a schematic view showing the configuration of an injector failure diagnostic device according to a first embodiment. The injector failure diagnostic device 1 of the present embodiment is to diagnose a failure of a plurality of injectors installed in a multi-cylinder internal combustion engine 2.

The multi-cylinder internal combustion engine 2, which is mounted on a construction machinery, for example, includes four cylinders (first cylinder 25, second cylinder 26, third cylinder 27 and fourth cylinder 28) arranged in series, injectors (first injector 21, second injector 22, third injector 23 and fourth injector 24) that inject fuel into the inside of the corresponding cylinders, and an injector controller 20 that controls the operation of the injectors.

In one example, the injector controller 20 includes a microcomputer made up of the combination of a central processing unit (CPU) that executes calculations, a read only memory (ROM) as a secondary storage device that records programs for the calculations, and a random access memory (RAM) as a temporary storage of the calculation progress or temporary control variables. The injector controller 20 controls operations including stopping and resuming of the injectors by executing the stored programs.

The injector failure diagnostic device 1 is installed in a mobile terminal such as a smartphone, a tablet terminal, a mobile phone, or a personal digital assistant (PDA). The following describes an example of the injector failure diagnostic device 1 that is installed in a smartphone 10, which may be other mobile terminals such as a tablet terminal, a mobile phone, and a PDA.

The injector failure diagnostic device 1 installed in the smartphone 10 is configured to be communicable with the multi-cylinder internal combustion engine 2. For example, the multi-cylinder internal combustion engine 2 is equipped with a serial/WIFI converter (not shown), so that the injector failure diagnostic device 1 communicates with the multi-cylinder internal combustion engine 2 via the serial/WIFI converter. Bluetooth (registered trademark) or wireless local area network (LAN) may be used instead of the serial/WIFI converter.

As shown in FIG. 1, the injector failure diagnostic device 1 includes a pseudo failure unit 11, an operating sound obtainment unit 12, a faulty injector identification unit 13, and a diagnosis result output unit 14.

The pseudo failure unit 11, in cooperation with the injector controller 20 of the multi-cylinder internal combustion engine 2, is configured to generate a pseudo failure to intentionally stop the fuel injection from each injector and then cancel the pseudo failure after a lapse of a predetermined time. Specifically, the pseudo failure unit 11 generates a pseudo failure that stops one of the four injectors (i.e., of the first injector 21, the second injector 22, the third injector 23, and the fourth injector 24) while maintaining the operation of the remaining injectors via the injector controller 20. The pseudo failure unit 11 generates this pseudo failure for the four injectors in turn.

In one example, the pseudo failure unit 11 firstly generates a first pseudo failure via the injector controller 20, which stops the fuel injection of the first injector 21 and maintains the operation of the second to fourth injectors 22 to 24. After a predetermined time elapses, the pseudo failure unit 11 cancels this first pseudo failure by resuming the stopped first injector 21 via the injector controller 20. Cancellation of the first pseudo failure means that all of the four injectors are put into operation.

Next, the pseudo failure unit 11 generates a second pseudo failure via the injector controller 20, which stops the fuel injection of the second injector 22 and maintains the operation of the first injector 21, the third injector 23, and the fourth injector 24. After a predetermined time elapses, the pseudo failure unit 11 cancels this second pseudo failure by resuming the stopped second injector 22 via the injector controller 20.

Subsequently, the pseudo failure unit 11 similarly generates and cancels the third pseudo failure, and the fourth pseudo failure in this order.

In one example, the operating sound obtainment unit 12 is a microphone built in the smartphone 10, and obtains the current operating sound that is the operating sound when the four injectors are operated, and obtains the pseudo-failure operating sound that is the operating sound when the above-mentioned first to fourth pseudo failure happens. This operating sound obtainment unit 12 is electrically connected to the faulty injector identification unit 13, and outputs the obtained current operating sound and pseudo-failure operating sound to the faulty injector identification unit 13.

The faulty injector identification unit 13 obtains the current operating sound and the pseudo-failure operating sound (i.e., the first pseudo-failure operating sound, the second pseudo-failure operating sound, the third pseudo-failure operating sound, and the fourth pseudo-failure operating sound) from the operating sound obtainment unit 12. The faulty injector identification unit 13 then determines whether each pseudo-failure operating sound is similar or not to the current operating sound to identify a faulty injector.

Figure 6:
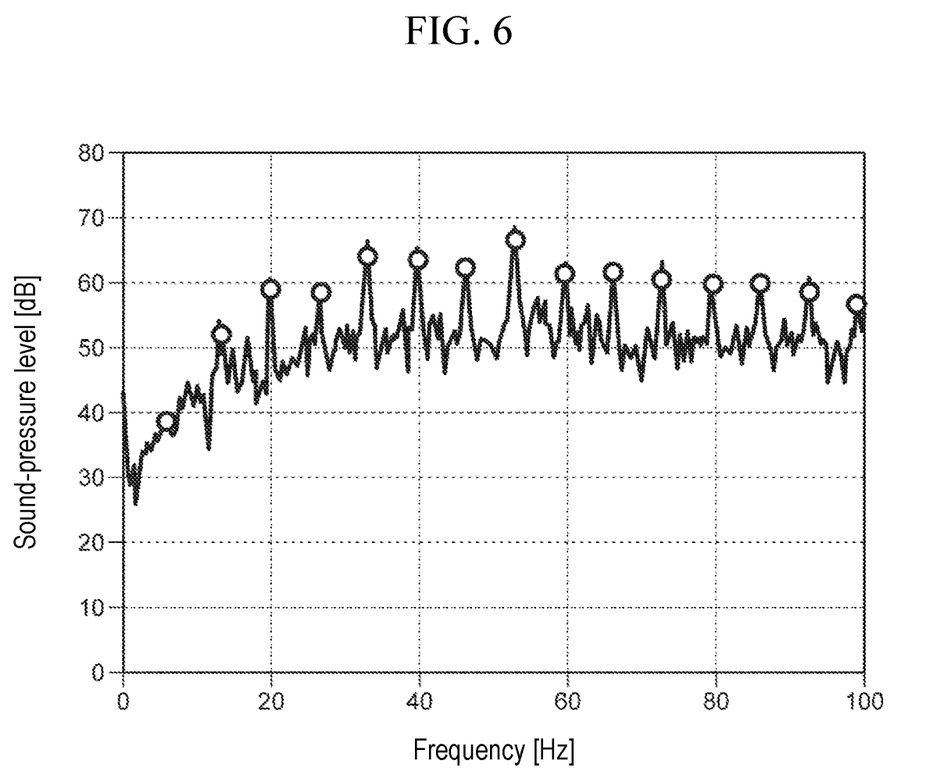
FIG. 6 explains similarity calculation based on the peaks observed at the integer multiple components of the frequency.

Specifically, the faulty injector identification unit 13 compares the first pseudo-failure operating sound, the second pseudo-failure operating sound, the third pseudo-failure operating sound, and the fourth pseudo-failure operating sound one by one with the current operating sound, and thus determines whether each of the sounds is similar or not to the current operating sound. For this similarity determination, the similarity is calculated between the current operating sound and the pseudo-failure operating sound of each injector based on the peaks of the frequency appearing in the frequency domain (e.g., the peaks observed at the integer multiple components of the ratio of the primary combustion frequency of the engine (i.e., multi-cylinder internal combustion engine) to the number of cylinders) as shown in FIG. 6, for example. This enables a determination with a high degree of accuracy about whether or not each pseudo-failure operating sound is similar to the current operating sound. In FIG. 6, the horizontal axis represents the frequency and the vertical axis represents the sound pressure level.

Instead of calculating a similarity based on the frequency peaks observed in the frequency domain as stated above, the similarity determination may be made by deleting the dimension of the data for visualization about the feature vector of each operational sound using the principal component analysis (PCA). Or it may be performed by calculating the cross-correlation function (similarity of the time axis) of each operating sound, or by performing a fast Fourier transform on the audio data of each operating sound and pattern-matching the frequency characteristics.

If it is determined that there is no similarity, the faulty injector identification unit 13 determines that there is no faulty injector. If it is determined that any pseudo-failure operating sound is similar, the faulty injector identification unit 13 identifies the injector corresponding to that pseudo-failure operating sound as the faulty injector.

The diagnosis result output unit 14 is electrically connected to the faulty injector identification unit 13, and receives a diagnostic result from the faulty injector identification unit 13 and informs the operator or the like of the result. For example, the diagnosis result output unit 14 informs the operator by displaying the presence or not of a faulty injector and information on the identified faulty injector, if any, such as the number of the injector, on the display screen of the smartphone 10. The information on the identified faulty injector may be displayed on the display screen of the smartphone 10 and also may be transmitted to a server described later.

In the injector failure diagnostic device 1 according to the present embodiment, the operating sound obtainment unit 12 obtains the current operating sound and the pseudo-failure operating sound for each injector, and the faulty injector identification unit 13 determines whether the pseudo-failure operating sound of each injector is similar or not to the current operating sound to identify a faulty injector. The injector failure diagnostic device 1 therefore easily diagnoses the mechanical failure of the injectors and easily identifies the faulty injector. The accuracy of diagnosis improves as compared with the diagnosis with human hearing.

The operating sound obtainment unit 12 and the faulty injector identification unit 13 are installed in a smartphone that is easy to carry, which enables handy and easy diagnosis for a mechanical failure of the injectors at the site.

[Method for Injector Failure Diagnosis]

Figure 2:
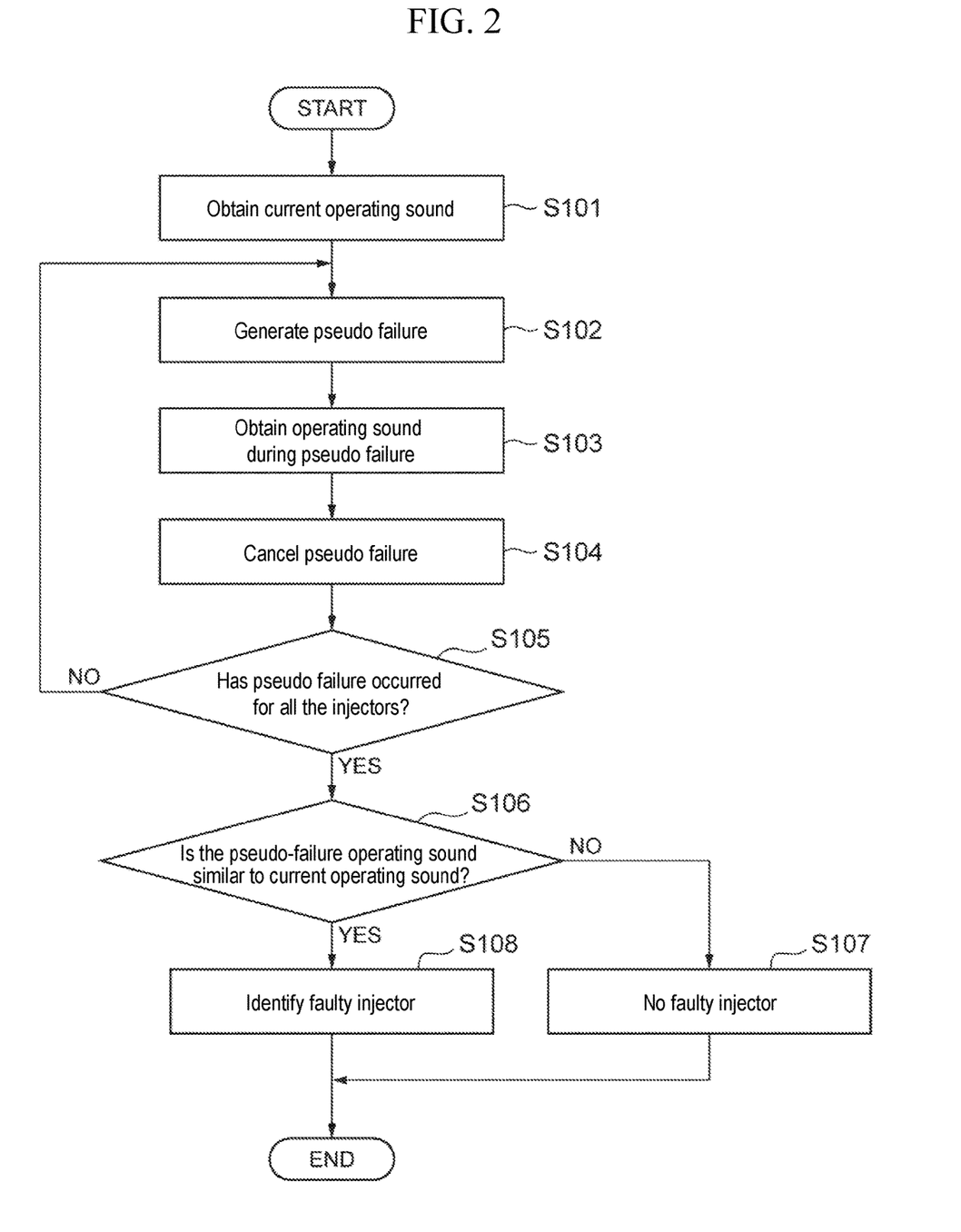
FIG. 2 is a flowchart for explaining the method for injector failure diagnosis.
Figure 3:
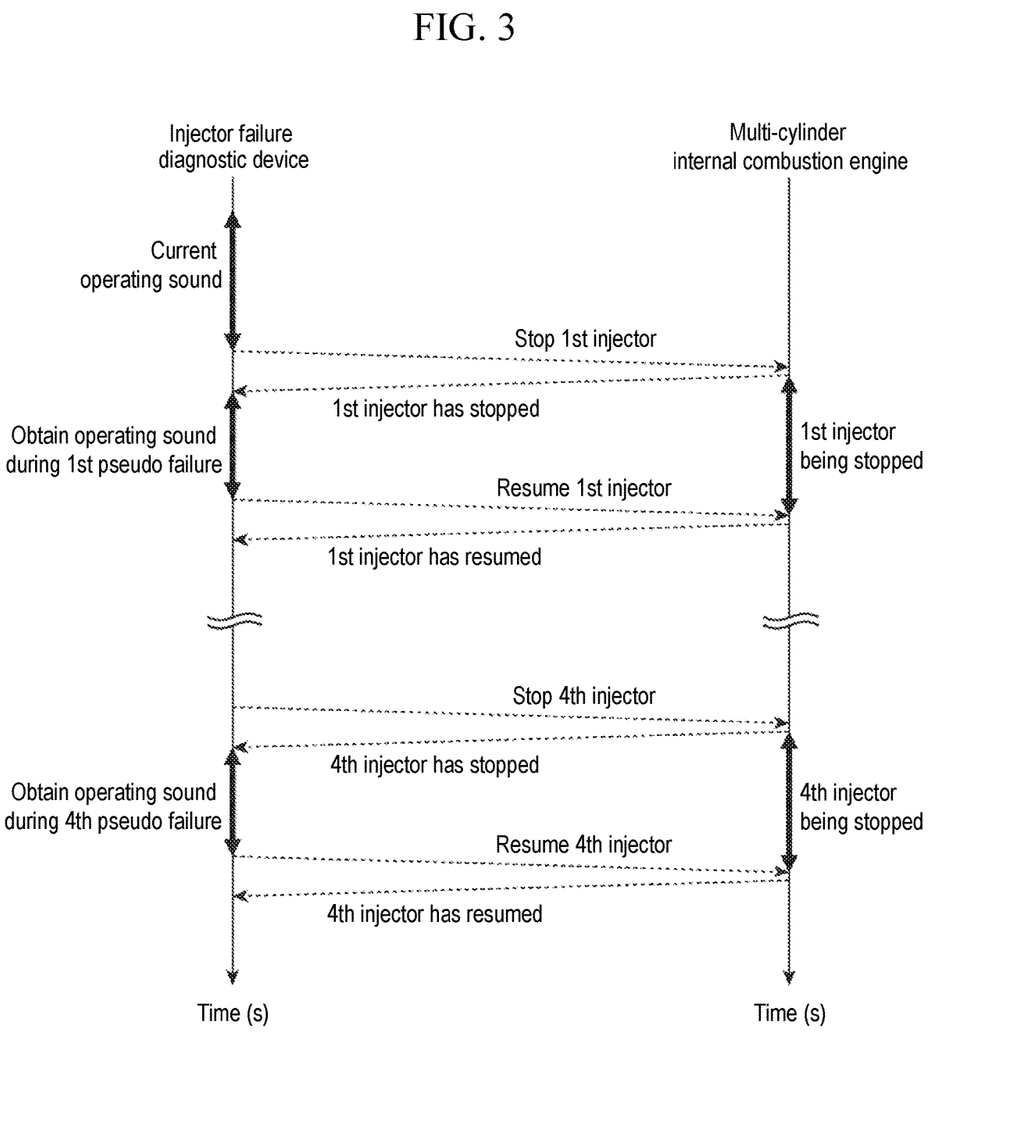
FIG. 3 explains the operating sound obtainment and the pseudo failures.

The following describes a method for injector failure diagnosis using the injector failure diagnostic device 1 with reference to FIGS. 2 to 5. FIG. 2 is a flowchart that explains the method for injector failure diagnosis, FIG. 3 is a diagram for explaining the operating sound obtainment and the pseudo-failures, and FIGS. 4A to 4C and FIGS. 5A to 5C are schematic diagrams for explaining the operation with a smartphone.

The method for injector failure diagnosis of the present embodiment includes: a current operating sound obtainment step of obtaining, as the current operating sound, the operating sound during the operation of four injectors; a pseudo-failure operating sound obtainment step of stopping fuel injection from one of the four injectors and maintaining the operation of the remaining three injectors to obtain a pseudo-failure operating sound, and sequentially obtaining the pseudo-failure operating sound of the four injectors; and a diagnosis step of determining whether or not the pseudo-failure operating sound of each injector obtained at the pseudo-failure operating sound obtainment step is similar to the current operating sound obtained at the current operating sound obtainment step to identify a faulty injector. In one example, this method for injector failure diagnosis is conducted when the multi-cylinder internal combustion engine 2 is idling (at the minimum rotation speed of the internal combustion engine).

Figure 4A:
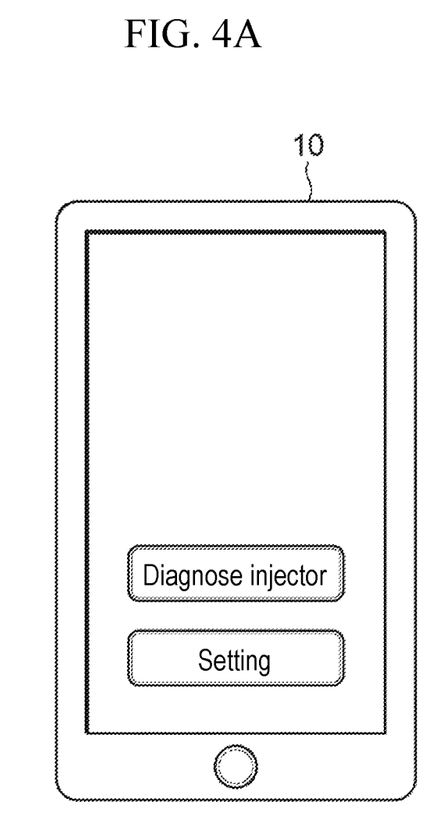
FIG. 4A is a schematic diagram for explaining the operation with a smartphone.
Figure 4B:
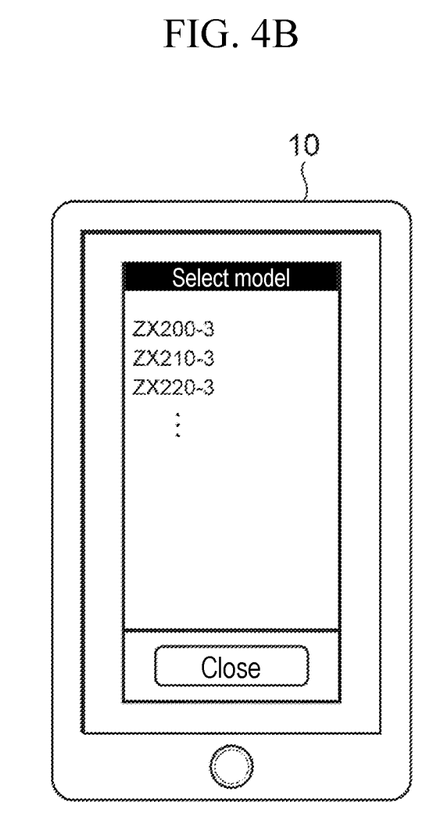
FIG. 4B is a schematic diagram for explaining the operation with a smartphone.
Figure 4C:
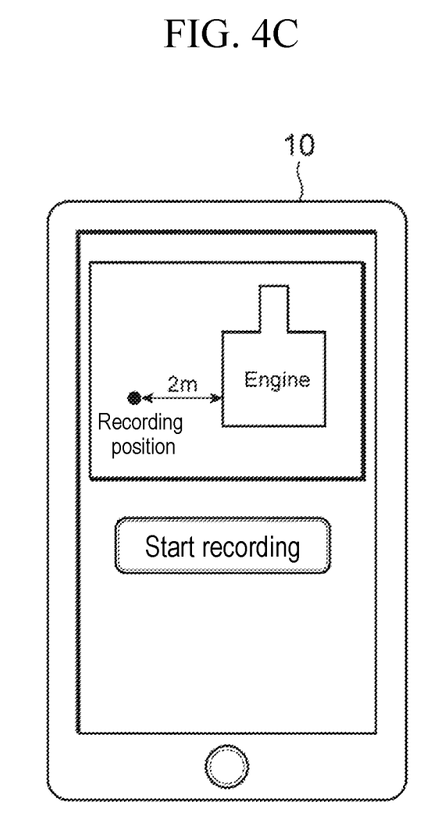
FIG. 4C is a schematic diagram for explaining the operation with a smartphone.

Specifically, the operator first prepares the injector failure diagnostic device 1 by selecting the application software for the injector failure diagnosis device 1 installed on the smartphone 10 (see FIG. 4A). Next, the operator selects the model of the multi-cylinder internal combustion engine 2 to be diagnosed (see FIG. 4B).

Subsequently, in step S101 shown in FIG. 2, the method obtains the current operating sound that is the operating sound during the operation of the four injectors via the operating sound obtainment unit 12. At this time, the operator follows the procedure displayed on the screen of the smartphone 10 to bring the smartphone 10 close to the multi-cylinder internal combustion engine 2 of the construction machinery toward the designated recording position (see FIG. 4C and FIG. 5A), and record the current operating sound with the microphone built into the smartphone 10 for a certain period of time (e.g., about 5 seconds) (see FIG. 5B). After the recording ends, the operating sound obtainment unit 12 transmits the recorded sound as the current operating sound to the faulty injector identification unit 13.

Step S101 corresponds to the "current operating sound obtainment step" recited in the claims.

Figure 5A:
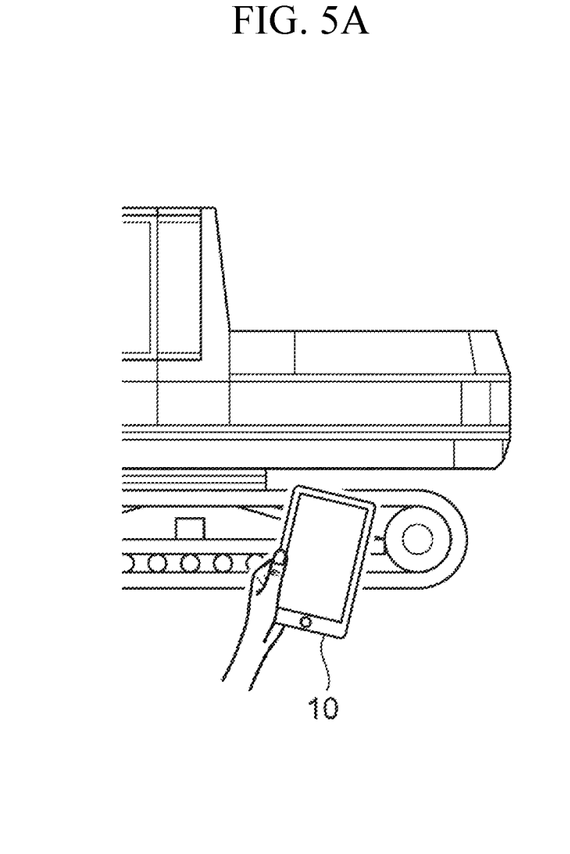
FIG. 5A is a schematic diagram for explaining the operation with a smartphone.
Figure 5B:
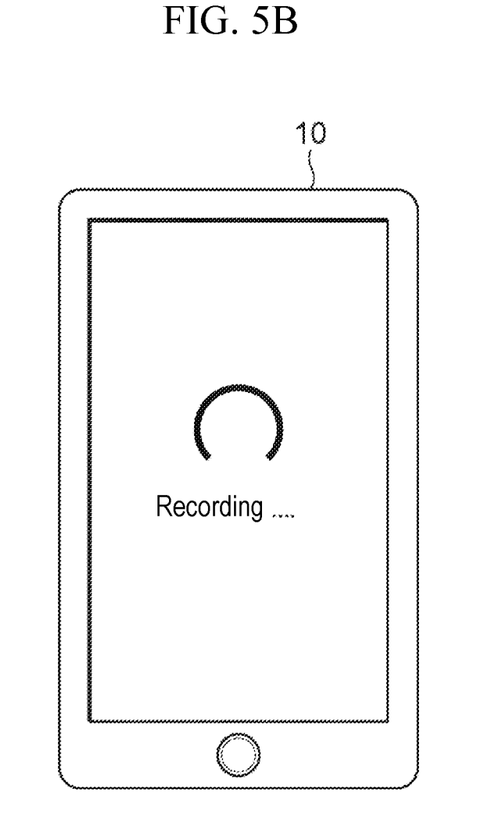
FIG. 5B is a schematic diagram for explaining the operation with a smartphone.
Figure 5C:
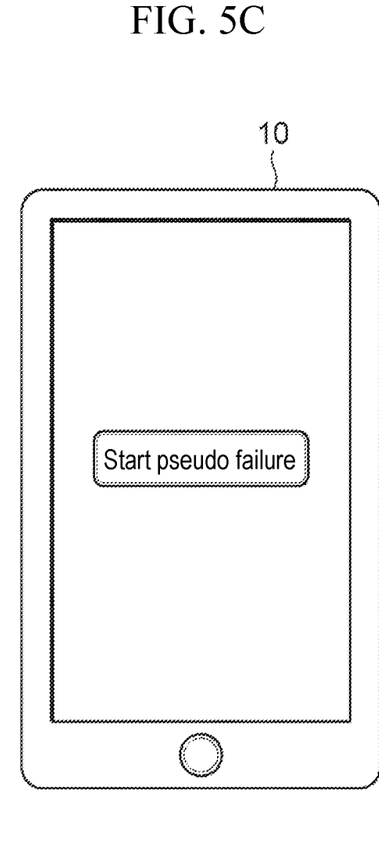
FIG. 5C is a schematic diagram for explaining the operation with a smartphone.

In step S102 following step S101, the method generates pseudo failures. At this time, as shown in FIG. 5C, the operator presses a pseudo-failure start button displayed on the screen of the smartphone 10 to select the pseudo failure unit 11 of the injector failure diagnostic device 1. This results in transmission of an instruction to generate a pseudo failure to the injector controller 20 of the multi-cylinder internal combustion engine 2, which controls to generate a first pseudo failure that stops the fuel injection from the first injector 21 and maintains the operation of the second to fourth injectors 22 to 24.

Specifically, as shown in FIG. 3, in response to transmission of an instruction to stop the first injector 21 from the injector failure diagnostic device 1 to the multi-cylinder internal combustion engine 2, the injector controller 20 receives the instruction and transmits a control signal for stopping to the first injector 21. This stops the fuel injection of the first injector 21. The second to fourth injectors 22 to 24 keep operating without stopping.

In step S103 following step S102, the method obtains the operating sound during pseudo failures. At this time, the operator follows the procedure displayed on the screen shown in FIG. 4C to bring the operating sound obtainment unit 12 (the smartphone 10 having the built-in microphone in this case) close to the multi-cylinder internal combustion engine 2 toward the designated recording position, and record the operating sound of the multi-cylinder internal combustion engine 2 for a certain period of time (a time similar to the recording time in step S101) (see FIGS. 5A and 5B). After the recording ends, the operating sound obtainment unit 12 transmits the recorded sound data as the first pseudo-failure operating sound to the faulty injector identification unit 13.

In step S104 following step S103, the method cancels the pseudo failure. Specifically, after a predetermined time (e.g., 25 sec.) elapses, the pseudo failure unit 11 transmits a cancellation instruction to the injector controller 20 of the multi-cylinder internal combustion engine 2 to resume the stopped first injector 21 via the injector controller 20. As shown in FIG. 3, in response to reception of an instruction to resume the first injector 21, the injector controller 20 transmits a control signal to resume the first injector 21. This resumes the first injector 21 to return to the state in which all of the four injectors are in operation.

In step S105 following step S104, the injector failure diagnostic device 1 determines whether or not a pseudo failure has occurred for all the injectors. If it is determined that a pseudo failure has not yet occurred for all of these injectors, the process returns to step S102 to generate pseudo failures again. Since this embodiment includes the four injectors, pseudo failures corresponding to the second injector 22, the third injector 23 and the fourth injector 24 occur in order, and the operating sound during the second to fourth pseudo failures is obtained accordingly.

Steps S102 to S105 correspond to the "pseudo-failure operating sound obtainment step" recited in the claims.

If it is determined in step S105 that pseudo failures have already occurred for all injectors, the process proceeds to step S106 to determine whether or not each pseudo-failure operating sound is similar to the current operating sound. To this end, the faulty injector identification unit 13 compares the first pseudo-failure operating sound, the second pseudo-failure operating sound, the third pseudo-failure operating sound, and the fourth pseudo-failure operating sound one by one with the current operating sound by the similarity determination method as stated above, and thus determines whether each of the sounds is similar or not to the current operating sound.

If it is determined that none of the first pseudo-failure operating sound, the second pseudo-failure operating sound, the third pseudo-failure operating sound and the fourth pseudo-failure operating sound are similar to the current operating sound, the faulty injector identification unit 13 determines that there is no faulty injector (see step S107). That is, if there is no pseudo-failure operating sound similar to the current operating sound, this means that the current operating sound is normal operating sound. This indicates that all injectors are operating normally.

If it is determined in step S106 that there is a similarity between the sounds, the faulty injector identification unit 13 identifies the faulty injector that is the injector corresponding to the pseudo-failure operating sound similar to the current operating sound (see step S108). For example, the determination may indicate that the first pseudo-failure operating sound and the second pseudo-failure operating sound are similar to the current operating sound. In this case, intentionally stopping of the first injector 21 corresponding to the first pseudo-failure operating sound and the second injector 22 corresponding to the second pseudo-failure operating sound will lead to the resulting operating sound that is similar to the first pseudo-failure operating sound or the second pseudo-failure operating sound. This indicates that the first injector 21 and the second injector 22 do not inject fuel and thus are faulty injectors. This allows the first injector 21 and the second injector 22 to be identified as faulty injectors.

Steps S106 to S108 correspond to the "diagnosis step" recited in the claims.

The method for injector failure diagnosis according to the present embodiment obtains the current operating sound and the pseudo-failure operating sound for each injector, and determines whether the obtained pseudo-failure operating sound of each injector is similar or not to the current operating sound to identify a faulty injector. The method therefore easily diagnoses the mechanical failure of the injectors and easily identifies the faulty injector. The accuracy of diagnosis improves as compared with the diagnosis with human hearing.

The method for injector failure diagnosis of the present embodiment is carried out when the multi-cylinder internal combustion engine 2 is idling. In this way, the method starts diagnosing after setting the multi-cylinder internal combustion engine 2 at the lowest rotational speed, which leads to the detection of an initial failure of the injectors caused by a fuel leak or stiffness, and thus enables a timely proposal for repair to the customer.

Note that, in this embodiment, the order of step S101 of obtaining the current operating sound and steps S102 to S105 of obtaining the pseudo-failure operating sounds may be reversed.

Second Embodiment of Injector Failure Diagnostic Device

Figure 7:
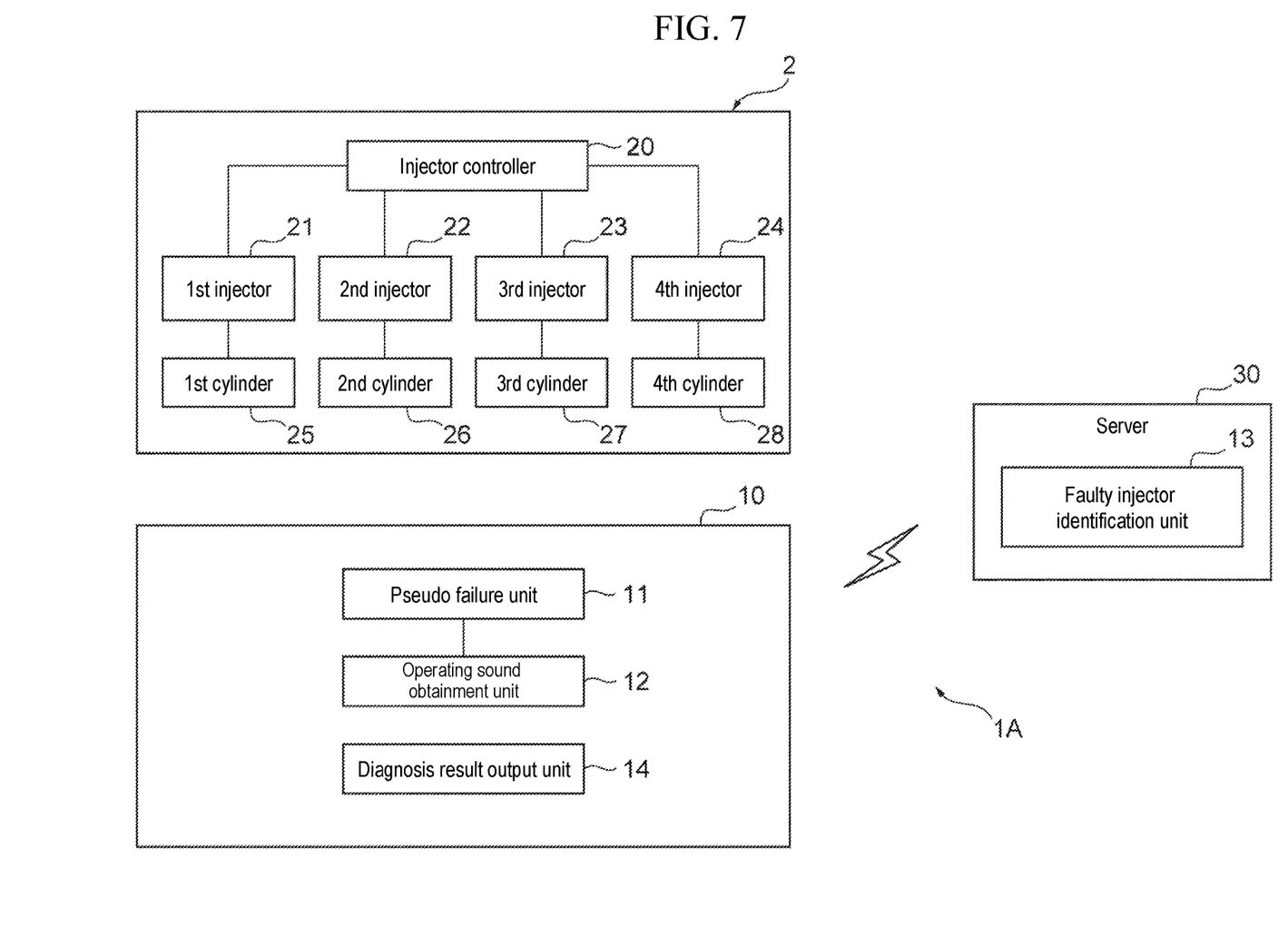
FIG. 7 is a schematic view showing the configuration of an injector failure diagnostic device according to a second embodiment.

FIG. 7 is a schematic view showing the configuration of an injector failure diagnostic device according to a second embodiment. The injector failure diagnostic device 1A of this embodiment differs from the first embodiment described above in that the faulty injector identification unit 13 is provided in a server 30, but the other configuration is the same as that of the first embodiment.

As shown in FIG. 7, the injector failure diagnostic device 1A of this embodiment is configured so that a pseudo failure unit 11, an operating sound obtainment unit 12 and a diagnosis result output unit 14 are provided in the smartphone 10, while the faulty injector identification unit 13 is provided in the server 30. The server 30 is located in the control center, for example, and is configured to be communicable with the smartphone 10.

In the injector failure diagnostic device 1A having this structure, the operating sound obtainment unit 12 transmits each obtained operating sound to the faulty injector identification unit 13 in the server 30, and the faulty injector identification unit 13 transmits the similarity determination results of the operating sounds and the identification results of the failure injector to the diagnosis result output unit 14.

The injector failure diagnostic device 1A of this embodiment has the same actions and advantageous effects as those of the first embodiment described above, and the faulty injector identification unit 13 provided in the server 30 increases the speed of processing the similarity determination of the operating sounds and the identification of the faulty injector compared with the injector failure diagnostic device 1 of the first embodiment.

The method for injector failure diagnosis using the injector failure diagnostic device 1A is the same as that described in the first embodiment above, and the redundant explanations are omitted.

Third Embodiment of Injector Failure Diagnostic Device

Figure 8:
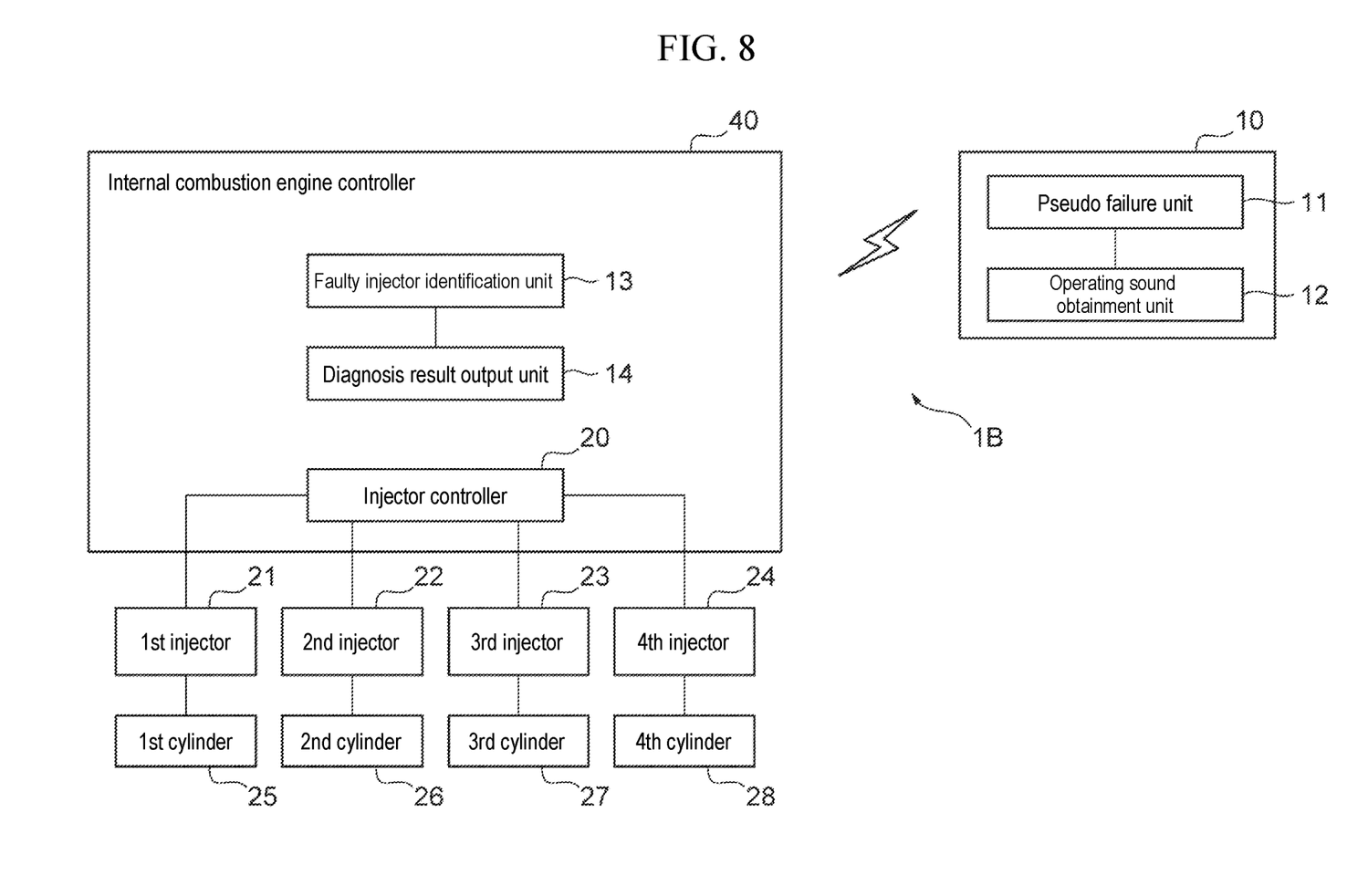
FIG. 8 is a schematic view showing the configuration of an injector failure diagnostic device according to a third embodiment.

FIG. 8 is a schematic view showing the configuration of an injector failure diagnostic device according to a third embodiment. The injector failure diagnostic device 1B of this embodiment differs from the first embodiment described above in that the faulty injector identification unit 13 and the diagnosis result output unit 14 are provided in an internal combustion engine controller 40 of the multi-cylinder internal combustion engine 2, but the other configuration is the same as that of the first embodiment.

As shown in FIG. 8, the injector failure diagnostic device 1B of this embodiment is configured so that a pseudo failure unit 11 and an operating sound obtainment unit 12 are provided in the smartphone 10, while the faulty injector identification unit 13 and the diagnosis result output unit 14 are provided in the internal combustion engine controller 40.

In one example, the internal combustion engine controller 40 includes a microcomputer made up of the combination of a central processing unit (CPU) that executes calculations, a read only memory (ROM) as a secondary storage device that records programs for the calculations, and a random access memory (RAM) as a temporary storage of the calculation progress or temporary control variables. The internal combustion engine controller 40 controls the overall operation of the multi-cylinder internal combustion engine 2 by executing the stored programs.

The internal combustion engine controller 40 includes an injector controller 20 as well as the faulty injector identification unit 13 and the diagnosis result output unit 14. This internal combustion engine controller 40 is configured to be communicable with the smartphone 10.

In the injector failure diagnostic device 1B having this structure, the operating sound obtainment unit 12 transmits each obtained operating sound to the faulty injector identification unit 13 in the internal combustion engine controller 40, and the faulty injector identification unit 13 transmits the similarity determination results of the operating sounds and the identification results of a failure injector to the diagnosis result output unit 14 to inform the operator or the like of the results via the diagnosis result output unit 14.

In one example, the diagnosis result output unit 14 includes a display for displaying the diagnosis result and a flashing lamp for alerting the operator. If necessary, the diagnosis result output unit 14 may be provided in both the internal combustion engine controller 40 and the smartphone 10. In this case, the operator is allowed to confirm the diagnosis results with both of the internal combustion engine controller 40 (that is, with the construction machinery) and with the smartphone 10.

The injector failure diagnostic device 1B of this embodiment has the same actions and advantageous effects as those of the first embodiment described above, and the faulty injector identification unit 13 and the diagnosis result output unit 14 provided in the internal combustion engine controller 40 increase the speed of processing the similarity determination of the operating sound and the identification of the faulty injector compared with the injector failure diagnostic device 1 of the first embodiment.

The method for injector failure diagnosis using the injector failure diagnostic device 1B is the same as that described in the first embodiment above, and the redundant explanations are omitted.

Fourth Embodiment of Injector Failure Diagnostic Device

Figure 9:
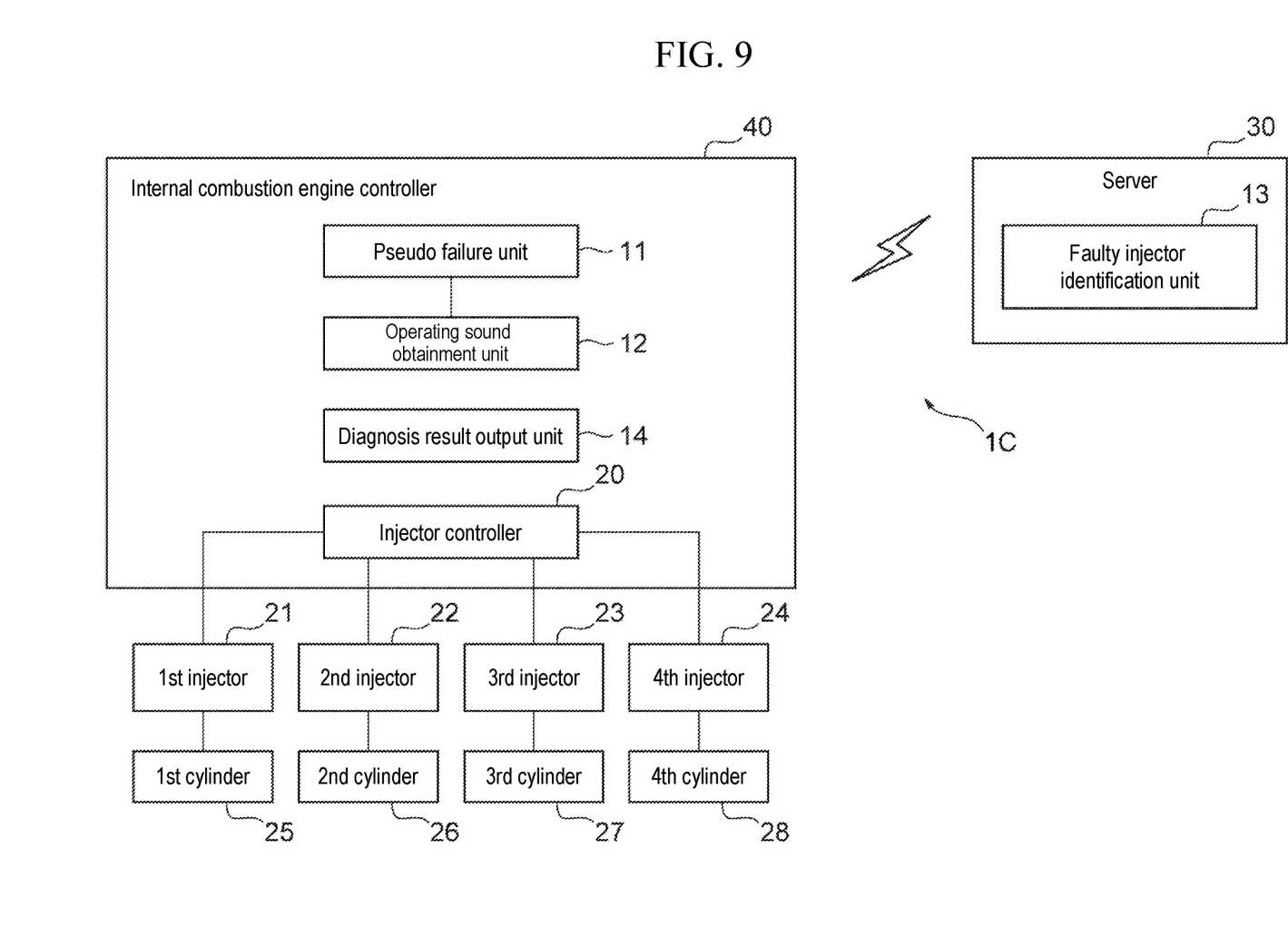
FIG. 9 is a schematic view showing the configuration of an injector failure diagnostic device according to a fourth embodiment.

FIG. 9 is a schematic view showing the configuration of an injector failure diagnostic device according to a fourth embodiment. The injector failure diagnostic device 1C of this embodiment differs from the first embodiment described above in that it does not include a smartphone, the pseudo failure unit 11, the operating sound obtainment unit 12 and the diagnosis result output unit 14 are provided in the internal combustion engine controller 40 of the multi-cylinder internal combustion engine 2, and the faulty injector identification unit 13 is provided in the server 30, but the other configuration is the same as that of the first embodiment.

As shown in FIG. 9, the injector failure diagnostic device 1C of the present embodiment is configured so that the pseudo failure unit 11, the operating sound obtainment unit 12, and the diagnosis result output unit 14 are provided in the internal combustion engine controller 40. The internal combustion engine controller 40 controls the overall operation of the multi-cylinder internal combustion engine 2 as described above, and is configured to be communicable with the server 30.

In the present embodiment, the operating sound obtainment unit 12 is configured to record the operating sound using a microphone placed in the engine room, for example, in accordance with an instruction from the internal combustion engine controller 40.

In the injector failure diagnostic device 1C having this structure, the operating sound obtainment unit 12 transmits each obtained operating sound to the faulty injector identification unit 13 in the server 30, and the faulty injector identification unit 13 transmits the similarity determination results of the operating sounds and the identification results of a failure injector to the diagnosis result output unit 14.

The injector failure diagnostic device 1C of this embodiment has the same actions and advantageous effects as those of the first embodiment described above, and the configuration including the pseudo failure unit 11, the operating sound obtainment unit 12 and the diagnosis result output unit 14 in the internal combustion engine controller 40 of the multi-cylinder internal combustion engine 2 and the faulty injector identification unit 13 in the server 30 allows the operator to easily diagnose the injector failure without going to the site.

The method for injector failure diagnosis using the injector failure diagnostic device 1C automatically starts under preset conditions (for example, once/500 hours or when the engine revolution speed reaches the minimum speed). For example, when the multi-cylinder internal combustion engine has been in operation for 500 hours, the internal combustion engine controller 40 activates the injector failure diagnostic device 1C to carry out failure diagnosis of each injector. The specific process in the method for injector failure diagnosis is the same as that described in the first embodiment above except that no smartphone is used, and the redundant explanations are omitted.

Fifth Embodiment of Injector Failure Diagnostic Device

Figure 10:
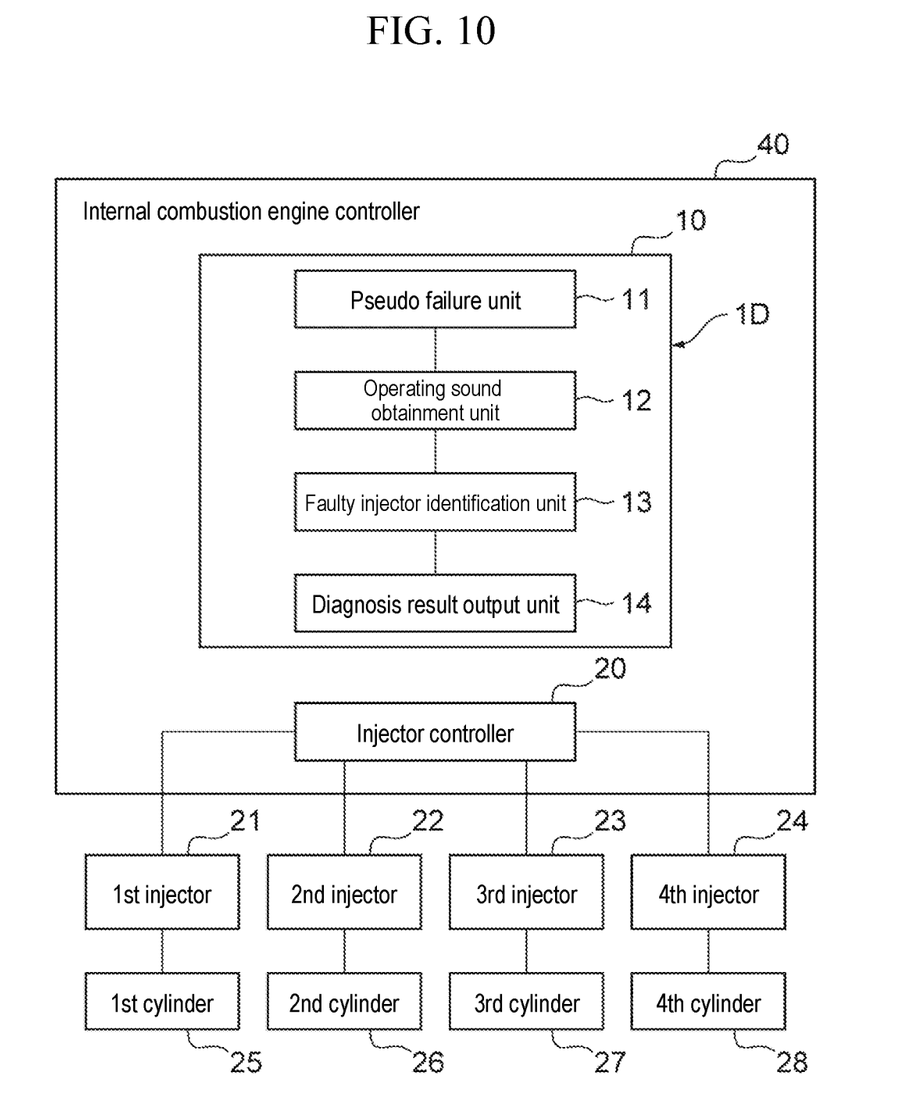
FIG. 10 is a schematic view showing the configuration of an injector failure diagnostic device according to a fifth embodiment.

FIG. 10 is a schematic view showing the configuration of an injector failure diagnostic device according to a fifth embodiment. The injector failure diagnostic device 1D of this embodiment differs from the first embodiment described above in that it does not include a smartphone, and all of the pseudo failure unit 11, the operating sound obtainment unit 12, the faulty injector identification unit 13 and the diagnosis result output unit 14 are provided in the internal combustion engine controller 40 of the multi-cylinder internal combustion engine 2, but the other configuration is the same as that of the first embodiment.

In the present embodiment, the operating sound obtainment unit 12 is configured to record the operating sound using a microphone placed in the engine room, for example, in accordance with an instruction from the internal combustion engine controller 40.

The injector failure diagnostic device 1D of this embodiment has the same actions and advantageous effects as those of the first embodiment described above, and the configuration including the pseudo failure unit 11, the operating sound obtainment unit 12, the faulty injector identification unit 13 and the diagnosis result output unit 14 in the internal combustion engine controller 40 of the multi-cylinder internal combustion engine 2 allows the operator to easily diagnose the injector failure without going to the site.

The method for injector failure diagnosis using the injector failure diagnostic device 1D automatically starts under preset conditions (for example, once/500 hours or when the engine revolution speed reaches the minimum speed). For example, when the multi-cylinder internal combustion engine has been in operation for 500 hours, the internal combustion engine controller 40 activates the injector failure diagnostic device 1D to carry out failure diagnosis of each injector. The specific process in the method for injector failure diagnosis is the same as that described in the first embodiment above except that no smartphone is used, and the redundant explanations are omitted.

That is a detailed description of the embodiments of the present invention. The present invention is not limited to the above-stated embodiments, and the design may be modified variously without departing from the spirits of the present invention recited in the claims.

REFERENCE SIGNS LIST 1, 1A, 1B, 1C, 1D Injector failure diagnostic device
2 Multi-cylinder internal combustion engine
10 Smartphone
11 Pseudo failure unit
12 Operating sound obtainment unit
13 Faulty injector identification unit
14 Diagnosis result output unit
21 First injector
22 Second Injector
23 Third Injector
24 Fourth Injector
25 First cylinder
26 Second cylinder
27 Third cylinder
28 Fourth cylinder
30 Server
40 Internal combustion engine controller

The invention claimed is:

1. An injector failure diagnostic device for a multi-cylinder internal combustion engine having a plurality of injectors, wherein each injector injects fuel to a corresponding cylinder, said injector failure diagnostic device comprising:
   an operating sound obtainment unit configured to obtain a current operating sound that is the operating sound when all of the injectors are operated, and obtain a plurality of pseudo-failure operating sounds, each of the plurality of pseudo-failure operating sounds being obtained sequentially in correspondence with stopping the fuel injection of each of the injectors, wherein each of the plurality of pseudo-failure sounds is an operating sound generated by stopping the fuel injection from one injector while maintaining the operation of the remaining injectors;
   a faulty injector identification unit that receives the plurality of pseudo failure sounds and the current operating sound and is configured to compare each of the plurality of pseudo failure sounds with the current operating sound to determine whether or not any of the pseudo-failure operating sounds corresponding to each of the injectors obtained by the operating sound obtainment unit is similar to the current operating sound to identify a faulty injector; and
   wherein the faulty injector identification unit calculates a similarity based on peaks observed at integer multiple components of a ratio of a primary combustion frequency of the multi-cylinder internal combustion engine to a number of the cylinders to determine whether or not the pseudo-failure operating sound corresponding to each injector is similar to the current operating sound.

2. The injector failure diagnostic device according to claim 1, further comprising a result output unit configured to output a result identified by the faulty injector identification unit.

3. The injector failure diagnostic device according to claim 1, wherein the operating sound obtainment unit and the faulty injector identification unit are disposed in a mobile terminal.

4. The injector failure diagnostic device according to claim 1, wherein the operating sound obtainment unit is disposed in a mobile terminal, and the faulty injector identification unit is disposed in a server that is communicable with the mobile terminal.

5. The injector failure diagnostic device according to claim 4, wherein the mobile terminal is a smartphone.

6. A method for diagnosing an injector failure in a multi-cylinder internal combustion engine having a plurality of injectors, wherein each injector injects fuel to a corresponding cylinder, said method for diagnosing an injector failure comprising:

a current operating sound obtainment step of obtaining a current operating sound that is the operating sound when all of the injectors are operated;

a pseudo-failure operating sound obtainment step of obtaining a plurality of pseudo-failure operating sounds, each of the plurality of pseudo-failure operating sounds being obtained sequentially in correspondence with stopping the fuel injection of each of the injectors, wherein each of the plurality of pseudo-failure sounds is an operating sound generated by stopping the fuel injection from one injector while maintaining the operation of the remaining injectors;

a diagnosis step of comparing each of the plurality of pseudo failure sounds with the current operating sound and determining whether or not any of the pseudo-failure operating sounds corresponding to each of the injectors obtained by the pseudo-failure operating sound obtainment step is similar to the current operating sound obtained at the current operating sound obtainment step to identify a faulty injector; and wherein the diagnosis step calculates a similarity based on peaks observed at integer multiple components of a ratio of a primary combustion frequency of the multi-cylinder internal combustion engine to a number of the cylinders to determine whether or not the pseudo-failure operating sound corresponding to each injector is similar to the current operating sound.

\* \* \* \* \*